United States Patent [19]

Akao

[11] Patent Number: 4,778,712
[45] Date of Patent: * Oct. 18, 1988

[54] PACKAGING FILMS FOR PHOTOSENSITIVE MATERIALS

[75] Inventor: Mutsuo Akao, Minami-Ashigara, Japan

[73] Assignee: Fuji Photo Film Co., Ltd., Kanagawa, Japan

[*] Notice: The portion of the term of this patent subsequent to Dec. 16, 2003 has been disclaimed.

[21] Appl. No.: 42,566

[22] Filed: Apr. 24, 1987

Related U.S. Application Data

[63] Continuation of Ser. No. 709,805, Mar. 8, 1985, abandoned.

[30] Foreign Application Priority Data

Mar. 9, 1984 [JP] Japan ................................. 59-43894

[51] Int. Cl.$^4$ ............................................. B32B 5/16
[52] U.S. Cl. ..................................... 428/213; 428/35; 428/220; 428/323; 428/334; 428/347; 428/458; 428/461; 428/483; 428/516; 428/913
[58] Field of Search ............... 428/220, 347, 483, 457, 428/500, 516, 35, 323, 334, 458, 461, 913

[56] References Cited

U.S. PATENT DOCUMENTS

| | | | |
|---|---|---|---|
| 4,147,291 | 4/1979 | Akao et al. | 229/55 |
| 4,258,848 | 3/1981 | Akao et al. | 206/524.2 |
| 4,331,725 | 5/1982 | Akao | 428/138 |
| 4,337,285 | 6/1982 | Akao et al. | 428/35 |
| 4,356,224 | 10/1982 | Akao et al. | 428/220 |
| 4,359,499 | 11/1982 | Akao et al. | 428/483 |
| 4,386,124 | 5/1983 | Akao | 428/35 |
| 4,411,943 | 10/1983 | Akao | 428/161 |
| 4,411,945 | 10/1983 | Akao et al. | 428/216 |
| 4,436,809 | 3/1984 | Akao et al. | 430/501 |
| 4,452,846 | 6/1984 | Akao | 428/220 |
| 4,469,741 | 9/1984 | Akao | 428/214 |
| 4,513,050 | 4/1985 | Akao | 428/200 |
| 4,565,733 | 1/1986 | Akao | 428/215 |
| 4,565,743 | 1/1986 | Akao | 428/522 |
| 4,576,865 | 3/1986 | Akao | 428/335 |
| 4,579,781 | 4/1986 | Akao | 428/461 |
| 4,584,234 | 4/1986 | Hirose et al. | 428/323 |
| 4,587,175 | 5/1986 | Akao | 428/596 |
| 4,629,640 | 12/1986 | Akao | 428/35 |
| 4,639,386 | 1/1987 | Akao | 428/35 |
| 4,653,640 | 3/1987 | Akao | 206/455 |
| 4,661,395 | 4/1987 | Akao | 428/213 |
| 4,661,401 | 4/1987 | Akao | 428/215 |
| 4,663,218 | 5/1987 | Akao | 428/212 |
| 4,687,692 | 8/1987 | Akao | 428/137 |

FOREIGN PATENT DOCUMENTS

| | | | |
|---|---|---|---|
| 3105337 | 12/1981 | Fed. Rep. of Germany. | |
| 8200020 | 1/1982 | PCT Int'l Appl. | |
| 2117536 | 10/1983 | United Kingdom | 428/516 |
| 2119707 | 11/1983 | United Kingdom | 428/200 |

Primary Examiner—Sharon A. Gibson
Attorney, Agent, or Firm—Burns, Doane, Swecker & Mathis

[57] ABSTRACT

A packaging film for photosensitive materials, which is a laminated film comprising at least three layers of an aluminum foil and two L-LDPE polyethylenic polymer layers laminated onto both sides of said aluminum foil, and in which:

(a) said L-LDPE polyethylenic polymer layers contain 50% by weight or more of a low-pressure-processed, linear low-density polyethylene resin (L-LDPE), (b) at least one of said L-LDPE polyethylenic polymer layers contain at least 0.5% by weight of a light-shielding substance, (c) said two L-LDPE polyethylenic polymer layers, formed on both sides of said aluminum foil, have a thickness ratio of no higher than 50%, and (d) said laminated film has a moisture permeability of no higher than 10 g/m$^2$ 24 hr (40° C. 90% RH). The light shielding substance is preferably carbon black.

18 Claims, 4 Drawing Sheets

PACKAGING FILMS FOR PHOTOSENSITIVE MATERIALS

This application is a continuation of application Ser. No. 709,805, filed Mar. 8, 1985, abandoned.

FIELD OF THE INVENTION

The present invention relates to a laminated film for packaging photosensitive materials, which makes use of a polyethylenic film, especially L-LDPE (low-pressure-processed, linear low-density polyethylene).

TECHNICAL BACKGROUND

Polyethylene films have been widely used as packaging materials but, in most cases, they assume the form of high-pressure-processed low-density polyethylene (LDPE) and low-pressure-processed high-density polyethylene (HDPE). Recently, there has been available L-LDPE (low-pressure-processed linear low-density polyethylene) called the third polyethylene and having the advantages of both low- and high-pressure-processed polyethylenes. Now, attention is paid to the possibility of using such L-LDPE as low-cost and high-strength polyethylene to meet current demand for energy and resources savings. However, L-LDPE is of transparency unsuitable for use in general packaging, so that it cannot be substituted for the prior art high-pressure-processed low-density polyethylene. In addition, it has been considered difficult to use L-LDPE even in a packaging field for which no transparency is needed owing to its unsatisfactory processability. In other words, L-LDPE, i.e., a copolymer of ethylene with other alpha-olefin, does not only need an extra amount of energy for the formation of films, but often leads to the necessity of new installations or modifications of film-making machines.

Packaging materials for the complete shielding of light are used to package light-sensitive materials, viz., photosensitive materials which lose their quality upon exposure to light. The properties then demanded include gas-shielding properties, light-shielding properties, moistureproofness, various physical strength (breaking strength, tear strength, impact perforation strength or extent of impact perforation, Gelbo test strength, etc.), heat sealability (heat seal strength, hot sealability, etc.), antistatic properties and the like. It is difficult for a single film material to possess all the aforesaid properties. For that reason, use has generally been made of composite laminated films comprising polyethylene films blended therein with carbon black, pigments, etc., and flexible sheets formed of, e.g., paper, aluminum foils, cellophane or the like.

Nonetheless, the prior art films have still had the disadvantages that their physical properties are not sufficient, i.e., they are torn or perforated during packaging, they peel off at the heat sealed portions, etc. Furthermore, the addition of a light-shielding substance such as carbon black results in a lowering of physical strength. It has been required, therefore, that the amount of the light-shielding substance to be added be limited to about 3%, while the films have a thickness exceeding 70 microns. This leads to bulky packaging, increased rigidity of the films, deterioration of packaging workability, and rises in the cost.

As the representative packaging materials for photosensitive materials there have been available laminates wherein two layers, a flexible sheet layer and a carbon black-containing polyethylene (LDPE) film layer are laminated on both sides of an aluminum foil as shown in FIG. 3. The reason for using the aluminum foil is to eliminate the disadvantages that the thermoplastic resin film is poor in moistureproofness, likely to be electrically charged or to be peeled-off, etc. The results are, on the contrary, that tear strength, extent of impact perforation and Gelbo test strength deteriorate considerably, as compared with the sole use of thermoplastic resin films and, in particular, a breakage problem arises in the packaging of heavy articles. In consequence, the thickness of the carbon black-containing LDPE films has been fixed at 70 microns or more.

As one manner for solving the problem that the addition of a light-shielding substance to the conventional high-pressure-processed low-density polyethylene (LDPE) films or the low-pressure-processed high-density polyethylene (HDPE) films leads to drops of the physical properties thereof, the present inventors have already proposed in U.S. Pat. No. 4,452,846 corresponding to Japanese Patent Kokai Publication No. 58-132555 a light-shielding film comprising an L-LDPE polyethylenic polymer and no less than 1% by weight of a light-shielding substance, wherein a low-pressure-processed linear low-density polyethylene (L-LDPE) accounts for no less than 50% by weight of the overall polyethylenic polymer. When composite laminated films (C3 and C4 in Table 1) have been made by simply using this prior art film and an aluminum foil without any modification, it has been found that, though they are more excellent than the conventional composite laminated films (R2, R3, R4) using carbon black-containing LDPE light shielding films and an aluminum foil, however, as compared with the light-shielding film (C2) based on L-LDPE alone of the prior application, their tear strength reduces to a half or less in spite of an increase in their thickness. Thus, it has been impossible to considerably reduce the thickness of such laminated films.

SUMMARY OF THE DISCLOSURE

To solve these problems, the present invention has for its object to provide a packaging film for photosensitive materials, which excels in physical strength such as tear strength, impact perforation strength, Gelbo test strength, etc., with improvements in such moistureproofness, gas-shielding properties and antistatic properties of the films formed of plastics alone that have been poor.

More specifically, the present invention provides a packaging film for photosensitive materials, which is a laminated film comprising at least three layers of an aluminum foil and two L-LDPE polyethylenic polymer layers laminated onto both sides of said aluminum foil, and in which:

(a) said L-LDPE polyethylenic polymer layers contain 50% by weight or more of a low-pressure-processed, linear low-density polyethylene resin (L-LDPE), (b) one or more of said L-LDPE polyethylenic polymer layers contain 0.5% by weight or more of a light-shielding substance, (c) said two L-LDPE polyethylenic polymer layers, formed on both sides of said aluminum foil, have a thickness ratio of no higher than 50%, and (d) said two laminated film has a moistureproofness or moisture permeability of no higher than 10 g/m$^2$ 24 hr (40° C., 90% RH).

One feature of the present invention is that the L-LDPE polyethylenic film layers having the given requirements are laminated onto both sides of the aluminum foil in such a manner that the latter is sandwiched between the former. Even though the same two layers be used, if two L-LDPE layers are applied on one side, rather than both sides, of the aluminum foil, such improvements in strength, especially, impact performation strength as achieved in the present invention are not then be introduced. In the case where the same L-LDPE resin layer is applied by a doubled thickness or thicker, the curl properties deteriorate to an extremity such that the film is tubularly rolled up. Thus the bag-making or packaging processing therefrom becomes almost impossible. Furthermore the impact perforation strength tested on the reverse side of the L-LDPE side markedly decreases (almost a half or less). A thicker layer would be required for attaining the requisite strength, however, such measure is disadvantageous in view of cost, bulkiness and a still deteriorated curling. Such thick layer structure will also entail deterioration in the moistureproofness due to moisture penetration through the thick cut section. In this connection the tested results should be referred to for comparison, e.g., the comparative sample C5 (Table 1) has a 100 microns thick L-LDPE layer on one side of aluminum foil and has a low tear strength and impact perforation strength, while the inventive sample 6 exhibits almost doubled or higher strengths.

The laminated films of the present invention excel in tear strength, flexibility, impact perforation strength, heat seal strength, hot peel strength, slip properties, Gelbo test strength, drop strength, moistureproofness, gas barrier properties, antistatic properties, light-shielding properties, etc., and so they are best-suited for the packaging of photographic photosensitive materials. As shown in Table 1, compared with the conventional laminated films relying upon LDPE films, the inventive films show markedly improved tear strength, impact perforation strength, flexibility, heat seal strength, hot peel strength, slip properties, Gelbo test strength, drop strength, etc., even though they are of the same thickness and structure. The films having such properties are useful for the packaging of photographic photosensitive materials which are sensitive to, conditions such as humidity, gases (oxygen gas, sulfurous acid gas), static electricity, etc. In the case of the single L-LDPE films of the prior application, however, any suitable packaging films for photosensitive materials are not obtained even by increasing the thickness thereof to an extreme extent, or even by adding an electrically conductive substance thereto. Nor is the desired object achieved with the use of films comprising a mere laminate of a single L-LDPE film and an aluminum foil.

BRIEF DESCRIPTION OF THE DRAWINGS

FIG. 13 is a sectional view of a packaging material for the packaging of photosensitive materials, which is a typical example of a double bag comprising an outer sheet A and an inner sheet B composed of the inventive materials of the layer structure shown in FIG. 2.

PREFERRED EMBODIMENTS OF THE INVENTION

Figure 1:
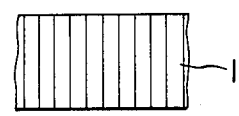
FIGS. 1 and 4 to 6 show L-LDPE control samples.

The term "L-LDPE polyethylenic polymer" referred to in the present disclosure shall embrace mixed polymers (blends) containing no less than 50% by weight of L-LDPE and at least one thermoplastic resin. The thermoplastic resins embrace olefinic polymers, ethylene copolymers with other various resins, e.g., high-, and low- or middle-pressure-processed polyethylenes, polypropylene, EEA, EVA, polybutene, polyisobutylene rubber or the like. A most preferred thermoplastic resin is LDPE. L-LDPE refers to a low-pressure-processed, low- or medium-density polyethylenic polymer, which is a copolymer obtained by the copolymerization of ethylene with an alpha-olefin having 3–13, preferably 4–10 carbon atoms, and is of the structure having a short branch in the linear chain.

More concretely, L-LDPE used in the present invention is commercially available under the trade names of UNIPOLE (UCC), DOWLEX (Dow Chemical), MARLEX (Phillips), SOLEAR (Du Pont, Canada), ULTZEX (Mitsui Petroleum Chemical Ind.), and such. The alpha-olefin used includes butene-1, octene-1, hexene-1, 4-methyl-pentene-1, etc., which are employed in an amount of about 0.5 to 10 mol % on the total polymer. L-LDPE is generally supposed to have a density nearly equal to that of the low- and medium-pressure-processed polyethylene, and most commercially available L-LDPE has a density ranging from 0.91 to 0.95 g/cm$^3$. With extrusion processability in mind, the density is preferably in a range of 0.91 to 0.935 g/cm$^3$, while the melting point MI is preferably in a range of 0.1 to 18 g/10 minutes.

The term "light-shielding substance" referred to in the present disclosure shall embrace any granular or powdery substance which is mixed with and dispersed through the L-LDPE polyethylenic polymer, and does not transmit visible (and ultraviolet) light therethrough. Photographically preferred are colored pigments having a small diameter and capable of absorbing or reflecting light easily, in particular, black pigments such as various carbon black and easily reflective aluminum paste from which volatiles have been removed. More concretely, the light-shielding substance that can be used in the present invention is inorganic or organic pigments such as various carbon black, iron oxides, zinc flower, titanium oxide, clay, aluminum powders, aluminum paste, calcium carbonate, mica, barium sulfate, talc, cadmium oxide pigments, chrome yellow, red iron oxide, cobalt blue, copper phthalocyanine base pigments, monoazo or polyazo base pigments, aniline black. It is noted that heat stabilizers, ultraviolet stabilizers, antioxidants, antistatics, lubricants, anti-blocking agents, etc. may be added to the L-LDPE polyethylenic polymer layers according to the conventional manner.

Depending upon the resin used, the machine applied, the cost involved, etc., the light-shielding substance may be used in vairous forms such as powdery coloring matters, pasty coloring matters, lubricating coloring matters, master batches, dyes and pigments, and colored pellets.

Referring to the amount of the light-shielding substance to be added, for instance, that of carbon black which is typical of the light-shielding substance, an increase in that amount assures improvements in light-shielding properties. With the prior art thermoplastic resins, however, there were drops of various strength. For that reason, there was no choice but to reduce the amount of carbon black to about 3%, in the case where it was used with the packaging films for photosensitive materials. To add to this, a thickness of no less than 70 microns should be given to the films to make up for their strength. This resulted in bulky packaging and an increase in the film strength, which caused deterioration of workability in packaging and created a problem in connection with resources savings.

The present inventor investigated the influence of the incorporation of carbon black, by using, in lieu of polyethylene, L-LDPE that was problematic if employed for packaging films. In consequence, it was found that, where carbon black was incorporated into L-LDPE, the unexpected results that the physical strength increased considerably were obtained, contrary to the case of high-pressure-processed low-density polyethylene (hereinafter called LDPE).

Compared with L-LDPE, LDPE originally has a lower strength, and a drop of strength becomes very marked, especially where carbon black is added. On the contrary, with L-LDPE there is a marked improvement in strength by the addition of carbon black.

The effect of carbon black to be added begins to appear in an amount of 0.5% by weight, becomes noticeable in an amount of 1% by weight, and becomes more marked in an amount exceeding 3% by weight. However, a further increase in that amount gives rise to an increase in the number of fisheyes, and results in a rise in the cost. With this in mind, a proper amount of carbon black is no less than 0.5% by weight, and more preferably 1 to 15% by weight.

More complete light-shielding properties are assured, if an aluminum foil is sandwiched by this light-shielding substance. However, if the substance is applied on either side of the aluminum foil, then it is more advantageously added to the inside thereof (to come into contact with an article to be wrapped) in view of light-shielding properties. This also reduces the possibility of breaking the light-shielding layer.

Depending upon the its manufacturing process, the carbon black that is typical of the light-shielding substance used in the present invention, is classified into channel-process carbon black, gas furnace-process gas black, thermal-process carbon black, etc. According to its raw material, it is classified into gas black, oil furnace black, anthracene black, acetylene carbon black, oil soot, palm soot, animal black, vegetable black, etc. In the present invention, furnace carbon black is desired in view of the light-shielding properties, cost and improvements in physical properties. It is also desired to use acetylene carbon black and Ketschen carbon black as the light-shielding material which is costly, but produces an antistatic effect. The carbon black that has the most-limited adverse influence upon photosensitive materials is oil furnace carbon black, 50% by weight or more of which has a particle size of no more than 30 microns, and the pH of which is 5 to 9. If necessary, mixing of the former carbon black with the latter, or two or more thereof (different in the type, size, pH, etc) can be undertaken depending upon the required properties. As mentioned in the foregoing, the light-shielding substances may be incorporated into the polyethylenic polymers in various forms, however, masterbatching is desirous in view of the cost and for the purpose of prventing environmental pollution at working areas. Japanese Patent Kokoku Publication No. 40-26196 discloses a process for preparing a polymer/carbon black masterbatch by dispersing carbon black in a solution of a polymer in an organic solvent, and Japanese Patent Kokoku Publication No. 43-10362 teaches a process for preparing a masterbatch by dispersing carbon black in polyethylene.

In particular, the present invention will now be explained with reference to the masterbatching method, to which the invention is not exclusively limited, and in which carbon black is incorporated into the polyethylenic polymer.

First of all, carbon black is mixed with LDPE (high-pressure-processed low-density polyethylene) in a high concentration of 2% by weight or higher, generally 10% by weight or higher, to form a masterbatch. The masterbatch is weighed in such a way that the carbon black content of the final product reaches the given value, and is mixed with L-LDPE. In this method there are two merits. One is that mixing and dispersion are more easily effected, as compared with direct mixing of carbon black with L-LDPE, leading to a cutdown in the cost and the prevention of occurrence of fisheyes.

Another is that the combination system of LDPE and L-LDPE is superior to the single system of L-LDPE in the processability at film preparation. As the masterbatching resin, L-LDPE may be used to cut down the mixing cost of carbon black. In the present invention, the masterbatching resin is preferably a polyolefinic resin having a melt index higher than that of L-LDPE in view of uniform mixing. It is to be noted that this holds substantially for the use of another light-shielding substances.

With L-LDPE, the melt tension and flowability posed grave problems in that the preparation of films therefrom did not only require larger energy than did the production of films from polyethylene, but design modification or even new installation of an inflation molding machine was also supposed to be needed.

In this connection, for instance, Japanese Patent Kokai Publication No. 55-117638 discloses a method for modifying the structure of a screw, which is adapted to reduce the amount of load impressed thereon and heat generated by the revolution thereof. Where 5% or higher of LDPE is contained in the L-LDPE polyethylenic polymer, a conventional T-die or inflation molding machine can be used without making any modification thereto, according to the masterbatching method of the present invention.

From the standpoint of processability alone, the less the amount of L-LDPE, the better the results will be. However, where the amount of LDPE is above that of L-LDPE in the present invention, carbon black produces no sufficient effect upon increases in strength. It is thus required that the amount of L-LDPE contained in the overall polyethylene polymer be preferably 50% or higher, more preferably 60% or higher. Although improvements in processability are achieved even by mere incorporation of LDPE into L-LDEP, the addition of the light-shielding substance makes a contribution to further increases in the bubble stability in combination with its own favorable influence.

On the other hand, the polymer blend system excels in physical properties, and is markedly improved in respect of tear strength, heat-seal strength and Gelbo test strength in particular. A part of the data is shown in Table 1. The L-LDPE polyethylenic polymer layer may be in the form of either a L-LDPE non-oriented film layer, or a mono- or bi-axially oriented film layer (connoting mono- or bi-axially oriented films). The two L-LDPE polyethylenic polymer layers applied on both sides of an aluminum foil may be identical or different in the thickness, degree of orientation, factor of stretching, direction of orientation or direction of stretching as well as the composition and the amount of the light-shielding substance to be added, as far as they are within the purport as defined in the appended claims. For instance, a longitudinally monoaxially stretched L-LDPE film layer and a transversely monoaxially stretched L-LDPE film layer may be laminated on both sides of an aluminum foil with their stretching axes intersecting each other.

The thickness of the L-LDPE polyethylenic polymer layer may be determined depending upon the strength required in correspondence to the weight and packaging form of an article to be wrapped, and may most generally and preferably be in a range of 20 to 100 microns.

A thickness departing from that scope may be applied especially where strength is demanded, and bulkiness is to be avoided.

Another factor that is important to the two L-LDPE layers is their thickness ratio.

The wording "thickness ratio" of the two L-LDPE polyethylenic polymer layers applied on both sides of an aluminum foil is generally defined in terms of the following equation:

$$\text{Thickness Ratio} = \left| \frac{\text{Thick } L\text{-}LDPE - \text{Thin } L\text{-}LDPE \text{ Layer}}{\text{Thin } L\text{-}LDPE \text{ Layer}} \right| \times 100$$

Figure 7:
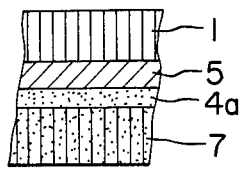
FIGS. 7 to 13 show the examples of the inventive films of the packaging for photosensitive materials.

Referring to FIG. 7 of the present disclosure, an illustrative example is a L-LDPE base transparent film 1 free from any light-shielding substance which has a thickness of 40 microns, and an L-LDPE base light-shielding film 7 containing a light-shielding substance which has a thickness of 50 microns. Then, the thickness ratio as referred to in the present invention is given by:

$$\text{Thickness Ratio} = \left| \frac{50 - 40}{40} \right| \times 100 = 25\%.$$

The smaller the thickness ratio, the better the results will be for the ordinary purpose. In general, that ratio is within 50%, preferably within 30% for easy application. A thickness ratio exceeding 50% is not preferred, since no sufficient improvements are introduced into, especially tear strength, impact perforation strength, Gelbo test strength, resistance to curling, processability, antistatic properties, light shielding properties and drop strength.

The aluminum foil used may have a suitable thickness depending upon the article to be packaged, and may have a thickness of about 6 to 15 microns in the case where strength is not particularly required.

Only with an aluminum foil having a thickness of no less than 9 microns, is it possible not only to obtain a moisture permeability of no higher than 10 g/m$^2$ 24 hr (40° C., 90% RH) that is a requisite for the packaging of photosensitive materials, but also to achieve a moisture permeability of no higher than 5 g/m$^2$ 24 hr that is a sufficiently safe value.

While the three essential layers of the present invention, i.e., the aluminum foil and the L-LDPE polyethylenic polymer layers laminated on both sides thereof, at least one of said layers containing 0.5% by weight or more of carbon black, are as discussed above, other layers may be further laminated to form a composite (laminated) film, when carrying out the present invention.

Other packaging materials used for the composite films according to the present invention may include other thermoplastic films such as, for instance, those of polyethylenes, ethylene copolymeric resins, polypropylenes, polyvinyl chloride, polyvinylidene chloride, polyamide, polycarbonate, fluorine resins, polyester, etc., or modified resins thereof.

Also preferable are also flexible sheets such as cellulose acetate films, cellophane, polyvinyl alcohol films, paper, aluminum foils, bonded fabrics, cross laminated porous fabrics, foamed sheets of polyethylene, polyurethane and polystyrene, and the like. The foregoing other packaging materials may be used alone or in combination.

The preparation of composite films by the lamination of the foregoing other packaging material and the essential three layers according to the present invention may or may not use an adhesive layer(s). For example, use may be made of the heat-bonding methods (hot plate-bonding, impulse bonding, high-frequency bonding and ultrasonic bonding), the methods using bonding agents or adhesives (wet-laminating, dry-laminating, hot-melt laminating, extrusion laminating) and the coextrusion laminating methods. The composite (laminated) films thus obtained are taken as being improved in respect of heat sealability, physical strength, slip properties, antistatic properties, printability, light-shielding properties, appearance, etc.

The adhesive includes extrusion laminate type adhesives comprising thermoplastics such as various kinds of polyethylene, ethylene-ethylacrylate copolymer, ethylene-vinyl acetate copolymer, L-LDPE, polypropylene, ionomer and the like; water soluble adhesives, solvent type adhesives, hot melt type adhesives and the like.

The packaging materials according to the present invention are best-suited for the packaging of photosensitive materials includes materials. The term "photosensitive materials such as silver halide photosensitive photographic materials, diazo photosensitive photographic materials, photosensitive resins, self-developing type photosensitive materials and diffusion transfer type photosensitive photographic materials and, in addition to such materials, any substance that suffers deterioration upon exposure to humidity and gases.

The packaging materials according to the present invention may be applied to the foregoing photosensitive substances in the form of single-sheet flat bags, double-sheet flat bags, bags with a rectangular bottom, self-supporting bags, single-sheet gussetted bags, two-sheet gussetted bags, film sheets, (initial) linings for moistureproof boxes, and reader paper, and in other every known form.

Depending upon use, photosensitive materials may be packaged by the films of the present invention for the packaging of photosensitive materials. Typically, photosensitive materials designated "C" are rolled up thereby, or alternatively sealed and wrapped in various forms of bags prepared therefrom. (See FIGS. 14 to 17).

Figure 14:
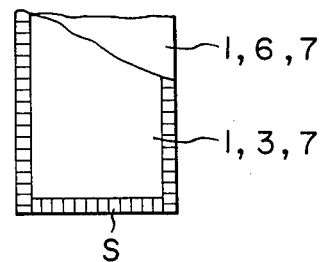
FIG. 14 is a partly cut-away perspective view of a flat bag formed of the inventive packaging material.

Depending upon the nature of the laminated films used, bag-making may rely upon the known plastic film-sealing techniques such as heat sealing, impulse sealing, ultrasonic sealing and high-frequency sealing. Bag-making may be effected with suitable adhesives, tackifiers, etc. In FIGS. 14 to 17, a capital S stands for the sealed portion. As illustrated in FIG. 14, the bag may be sealed entirely therearound. Alternatively, the bag may be sealed discretely or partly therearound.

Figure 15:
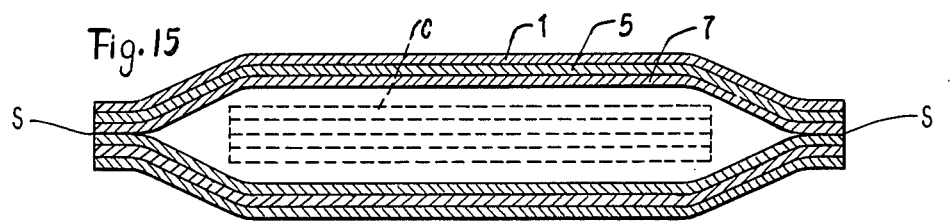
FIG. 15 is a sectional view of a photographic photosensitive material which is completely sealed and packaged.
Figure 16:
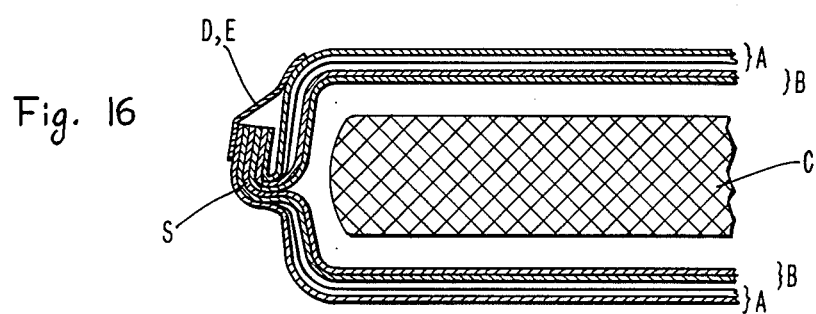
FIG. 16 is a sectional view of a double-gussetted bag sealed therein with a photosensitive material, the inner sheet of said bag being formed of the inventive packaging material.
Figure 17:
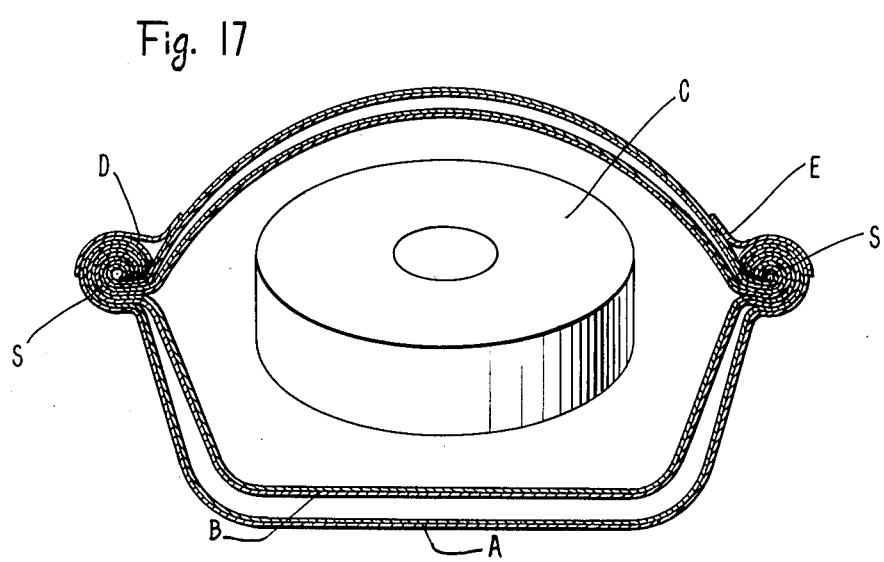
FIG. 17 is a sectional view of a monochrome or color roll-photosensitive material (photographic paper, cinefilms, printing films, indirect X-ray films, microfilms, etc.) in packaged form.

The bag may be of every known or other form or layer structure. For example, single-layer flat bags are illustrated in FIGS. 14 and 15, while double-layer gussetted bags comprising inner and outer sheets are shown in FIGS. 16 and 17.

Over the prior art packaging materials R1, R2, R3 and R4 as well as the control packaging materials C1, C2, C3 and C4 including an L-LDPE film alone and an L-LDPE light-shielding layer used together with an aluminum foil for antistatic purposes, the packaging materials according to the present invention are improved in respect of the tear strength, extent of impact perforation, Gelbo test strength, resistance to curling, processability, antistatic properties, light-shielding properties and drop strength, and are thus best-suited as the films for the packaging for photosensitive materials.

EXAMPLES

The present invention will now be explained with reference to typical examples of the preferred embodiments of the packaging materials according to the present invention as well as comparison examples. The details of the respective samples are given below.

Figure 2:
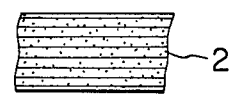
FIGS. 2 and 3 show an example of the conventional film for the packaging of photosensitive materials.

Control sample C1 is a transparent film which is illustrated in FIG. 1, and is composed of L-LDPE (ULTZ EX 2020L manufactured by Mitsui Petrochemical) of 50 microns in thickness and free from any light-shielding substance. Conventional sample R1 is a light-shielding film layer 2 which is illustrated in FIG. 2, and is composed of LDPE (DFD-0111 manufactured by Nippon Unicar) having a thickness of 70 microns and containing 3% by weight of carbon black.

Figure 3:
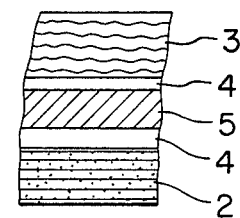
Figure 4:
Figure 5:
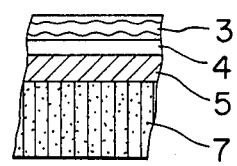
Figure 6:
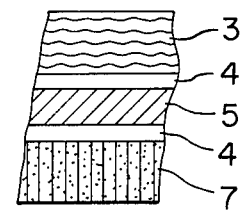
Figure 9:
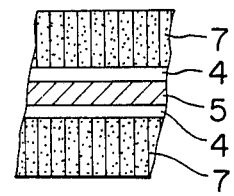

Conventional sample R2 is a laminated film which is shown in FIG. 3, and is obtained by the lamination of a flexible sheet 3 defined by bleached kraft paper of 35 g/m², an LDPE light-shielding layer 2 defined by a high-pressure-processed low-density polyethylene (LDPE) film having a thickness of 70 microns and containing 3.0% by weight of carbon black, LDPE adhesive layers 4 of 15 microns in thickness and an aluminum foil 5 of 7 microns in thickness. Conventional sample R3 is a laminated film similar to that of FIG. 3, provided however that the LDPE light-shielding layer 2 is an LDPE film having a thickness of 50 microns and containing 3.0% by weight of carbon black, and a 50 micron-thick LDPE film containing 3.0% by weight of carbon black is further laminated onto the outside of the flexible sheet 3 through another LDPE adhesive layer 4. Control sample C2 is shown in FIG. 4, and is composed of a 50 micron-thick L-LDPE polyethylenic polymer light-shielding film containing 6% by weight of carbon black, 15% by weight of LDPE and 79% by weight of L-LDPE. Conventional sample R4 is a laminated film of a layer structure similar to that of FIG. 9, provided however that, in place of 7, use is made of 50 micron-thick LDPE films containing 3% by weight carbon black, said films being laminated on both sides of a 7 micron-thick aluminum foil 5 through LDPE adhesive layers 4. Control samples C3 (and C5) are laminated films which are shown in FIG. 5, and is composed of a 7 micron-thick aluminum foil 5 having a 70 (and 100) micron-thick L-LDPE polyethylenic polymer light-shielding layer 7 laminated directly onto one side and having a flexible sheet 3 laminated onto the opposite side through a 15 micron-thick LDPE adhesive layer 4, said sheet 3 being defined by bleached kraft paper of 35 g/m². Control sample C4 is shown in FIG. 6, and is a laminated film composed of a 7 micron-thick aluminium foil 5, onto one side of which is laminated a 50 micron-thick L-LDPE polyethylenic polymer light shielding layer containing 6% by weight of carbon black, 15% by weight of LDPE and 79% by weight of L-LDPE through a 15 micron-thick LDPE adhesive layer, and onto the opposite side of which is laminated a flexible sheet layer 3 through a 15 micron-thick LDPE adhesive layer, said layer 3 being defined by bleached kraft paper of 35 g/m².

Inventive sample 1 is illustrated in FIG. 7, and is a laminated film composed of a 50 micron-thick L-LDPE polyethylenic polymer light-shielding film 7 containing 6% by weight of carbon black, 15% by weight of LDPE and 79% by weight of L-LDPE and being laminated on the back side of a 7 micron-thick aluminum foil 5 through a 15 micron-thick EEA adhesive layer 4a, and a 40 micron-thick, transparent L-LDPE polyethylenic polymer film 1 containing 15% by weight of LDPE and 85% by weight of L-LDPE and being laminated directly onto the front side of said foil. Inventive sample 2 is sketched in FIG. 8, and is a laminated film composed of a 7 micron-thick aluminum foil 5 onto both sides of which are directly laminated L-LDPE polyethylenic polymer light-shielding layers 7 each being 50 microns in thickness and containing 3% by weight of carbon black, 7.5% by weight of LDPE and 89.5% by weight of L-LDPE. Inventive sample 3 is sketched in FIG. 9, and is a laminated film obtained by the lamination of L-LDPE polyethylenic polymer light-shielding film layers onto both sides of a 7 micron-thick aluminum foil 5 through 15 micron-thick LDPE adhesive layers 4, each of said film layers being prepared by the inflation method, being 50 microns in thickness, and containing 3% by weight carbon black, 7.5% by weight of LDPE and 89.5% by weight of L-LDPE.

Inventive sample 4 is sketched in FIG. 9, and is a laminated film obtained by laminating onto the side (to face an article) of a 7 micron-thick aluminum foil a 70 micron-thick L-LDPE polyethylenic polymer light-shielding film 7 containing 3% by weight of carbon black, 7.5% by weight of LDPE and 89.5% of L-LDPE and being separately formed by the inflation method and on the opposite side of said foil 5 a 50 micron-thick L-LDPE polyethylenic polymer light-shielding film 7 having the same composition and being formed by the same method, said lamination being achieved through 15 micron-thick LDPE adhesive layers 4.

Inventive sample 5 corresponds to FIG. 10, and is a laminated film obtained in the following manner. A 50 micron-thick, transparent L-LDPE polyethylenic polymer film layer 1 free from any light-shielding substance is laminated directly onto one side of a 7 micron-thick aluminum foil 5. After the foil 5 has been laminated directly on the other side with a 50 micron-thick L-LDPE polyethylenic polymer light-shielding film layer 7 containing 6% by weight of a light-shielding substance (carbon black), 15% by weight of LDPE and 79% by weight of L-LDPE, a flexible sheet (bleached kraft paper of 60 g/m$^2$) layer 3a containing 5% by weight of a light shielding substance (carbon black) is laminated thereon through a 15 micron-thick LDPE adhesive layer 4.

Inventive sample 6 corresponds to FIG. 11, and is a laminated film obtained in the following manner. A 7 micron-thick aluminum foil 5 is laminated onto the side to face an article with a 50 micron-thick L-LDPE polyethylenic polymer light-shielding film layer 7 formed by the inflation method and containing 3% by weight of a light-shielding substance (aluminum paste), 82% by weight of L-LDPE and 15% by weight of LDPE, said lamination being achieved through a 15 micron-thick EEA (No. 6170 manufactured by Nippon Unicar) adhesive layer 4a containing 3% by weight of a light-shielding substance (carbon black). The aluminum foil 5 is laminated on the opposite side with a flexible sheet layer 3 defined by a 20 micron-thick, biaxially stretched polyester film through a 35 micron-thick L-LDPE polyethylenic polymer layer light-shielding film layer 7 containing 2% by weight of carbon black as a light-shielding substance, 30% by weight of LDPE and 68% by weight of L-LDPE.

Figure 12:
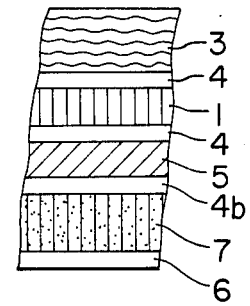

As illustrated in FIG. 12, inventive sample 7 is a laminated film obtained in the following manner. A 7 micron-thick aluminum foil 5 is laminated on the side to face an article with a 50 micron-thick L-LDPE polyethylenic polymer light-shielding film layer 7 containing 6% by weight of a light-shielding substance (carbon black) through a 15 micron-thick L-LDPE polyethylenic (45% LDPE+55% L-LDPE) polymer adhesive layer 4b. There is then laminated onto the light-shielding film layer 7 a 20 micron-thick heat-sealing layer 6 consisting of an ionomer resin (Surlyn manufactured by Du Pont) to prevent the article from being contaminated with the carbon black-containing light-shielding film layer 7 and to afford low-temperature heat sealability. The aluminum foil 5 is laminated, through a 15 micron-thick LDPE adhesive layer 4, on the opposite side with a 50 micron-thick, transparent L-LDPE polyethylenic polymer film layer 1 being obtained from an L-LDPE (ULTZ EX 2020L manufactured by Mitsui Petroleum Chemical Industries Co., Ltd.) resin alone by the inflation method. Through a 15 micron-thick LDPE adhesive layer 4, a flexible sheet layer 3 defined by bleached kraft paper of 35 g/m$^2$ is further laminated thereof.

Inventive sample 8 is a double-structure laminated film consisting of an outer sheet A and an inner sheet B. In the outer sheet A, a 15 micron-thick LDPE heat-sealing layer 6 is laminated onto a flexible sheet layer 3 defined by unbleached kraft paper of 70 g/m$^2$. In the inner sheet B, a 7 micron-thick aluminum foil 5 is laminated onto both its sides with 50 micron-thick L-LDPE polyethylenic polymer light-shielding film 7 each being separately prepared by the inflation method and being of the composition of 4.5 wt % carbon black, 9.5 wt % LDPE and 86 wt % L-LDPE, said lamination being achieved through 15 micron-thick LDPE adhesive layers 4. This sample is best-suited for the packaging for heavy photosensitive films in the form with a sharp edge or in the rolled form, or heavy rolled photographic paper.

This packaging material assures flexible packaging showing excellent physical strength, especially when it is used in the form of a double-sheet flat bag, a two-sheet gussetted bag, etc., as illustrated in FIGS. 16 and 17.

For the purpose of comparison, Table 1 summarizes the layer structures and properties of the aforesaid conventional samples R1-4, the control samples C1-5, and the inventive samples 1-8.

While the foregoing examples have been described with reference to typical examples of the preferred embodiments of the films for the packaging of photosensitive materials according to the present invention, it is understood that the present invention is not limited thereto, and is applicable to the composition of other L-LDPE polyethylenic polymers and other layer structures as well as the layer structures combined with other known materials.

TABLE 1

Resin Composition and Layer Structure of Packaging Materials of Examples as well as Comparison of Properties Thereof

Figure 8:
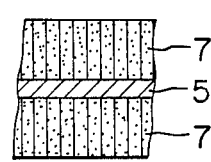
Figure 10:
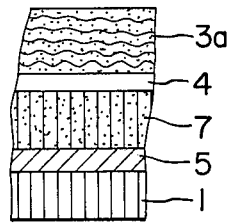
Figure 11:
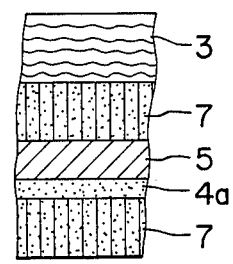

| | | | Conventional Samples (LDPE Light-shielding Films) | | | | Inventive Samples (including an aluminum foil on both sides of which are laminated two L-LDPE films having a thickness ratio of no higher than 50%) | | | | | |
|---|---|---|---|---|---|---|---|---|---|---|---|---|
| Reference Numerals in the Drawings | Item | Unit | R1 | R2 | R3 | R4 | 1 | 2 | 3 | 4 | 5 | 6 |
| Composition and Layer Structure of Packaging Materials | Packaging Material No. | | | | | | | | | | | |
| | Amount of L-LDPE | wt % | 0 | 0 | 0 | 0 | 79 85 | 89.5 | 89.5 | 89.5 | 100 79 | 82 68 |
| | Amount of LDPE | wt % | 97 | 97 | 97 | 97 | 15 15 | 7.5 | 7.5 | 7.5 | 0 15 | 15 30 |
| | Amount of Light-shielding Substance (Carbon Black Save Inventive Sample No. 6) | wt % | 3 | 3 | 3 | 3 | 6 0 | 3 | 3 | 3 | 0 6 | aluminium paste 3 2 |
| 7 | Thickness of L-LDPE Film Layer (to face an article) | μm | — | — | — | — | 50 — | 50 | 50 | 70 | 50 — | 50 — |
| 7 | (not to face an article) | μm | — | — | — | — | — 40 | 50 | 50 | 50 | — 50 | — 35 |
| 2 | Thickness of LDPE Layer | μm | 70 | 70 | 50 × 2 | 50 × 2 | — | — | — | — | — | — |
| 3 | Flexible Sheet Type | — | — | 35 g/m² Bleached Kraft Paper | as left | — | — | — | — | — | 5% Carbon-containing Bleached Kraft Paper | Biaxially Stretched Polyester Film |
| 3 | Flexible Sheet Thickness | μm | — | 43 | 43 | — | — | — | — | — | 66 | 20 |
| 5 | Metal Foil Thickness | μm | — | Aluminum Foil 7 | — | — | Aluminum Foil 7 | as left | as left | Aluminum Foil 7 | as left | as left |
| 4 | Adhesive Layer Type and Thickness | μm | — | LDPE 15 × 2 | LDPE 15 × 3 | LDPE 15 × 2 | 3% carbon containing EEA 15 | — | LDPE 15 2 | LDPE 13 × 2 | LDPE 15 | 3% carbon-containing EEA 15 |
| 4a,4b | Heat-sealing Layer Type and Thickness | μm | — | — | — | — | — | — | — | — | — | — |
| 6 | Layer Structure Figure | — | FIG. 2 | FIG. 3 | Lamination of LDPE Layer on FIG. 3 | 2 was used for 7 in FIG. 9 | FIG. 7 | FIG. 8 | FIG. 9 | FIG. 9 | FIG. 10 | FIG. 11 |
| | Total Thickness of Laminated Film | μm | 70 | 158 | 195 | 138 | 115 | 108 | 138 | 156 | 188 | 128 |
| | Thickness Ratio of Two L-LDPE Layers | % | — | — | — | — | 25 | 0 | 0 | 40 | 0 | 43 |
| Properties | Tear Strength Longitudinal | g | 100 | 212 | 234 | 86 | 605 | 491 | 647 | 832 | 678 | 713 |
| | Transverse | g | 312 | 157 | 610 | 234 | 1120 | 991 | 1310 | 1582 | 1317 | 1016 |
| | Impact Perforation Strength | kg · cm | 3.8 | 4.6 | 5.1 | 8.6 | 18.6 | 16.7 | 20.5 | 23.2 | 25.6 | 17.8 |
| | Moistureproofness | g/m² · 24 hr | X11 | A no more than 3 | A no more than 3 | A no more than 3 | A no more than 3 | A as left | A as left | A no more than 3 | A as left | A as left |
| | Light-shielding Properties | — | C-B | B | A | A | B | A | A | A | A | B |
| | Peeling Electrostatic Voltage | V | X-513 | B + 21 | B + 48 | B + 48 | A + 9 | A + 18 | B + 45 | B + 51 | A + 7 | A + 11 |
| | Hot-Tack Properties (Hot-seal Ability) | | D | D | D | D | A | A | A | A | A | A |
| | Curling | | | | | | | | | | | |

Details of Packaging Materials

TABLE 1-continued

Resin Composition and Layer Structure of Packaging Materials of Examples as well as Comparison of Properties Thereof

Figure 13:
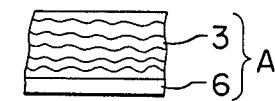
Figure 13:
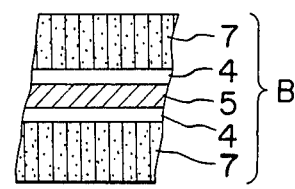

| | | | | | num foil on both sides of which are laminated two L-LDPE films having a thickness ratio of no higher than 50% | | Control Samples (using L-LDPE Film) | | | | |
|---|---|---|---|---|---|---|---|---|---|---|---|
| Reference Numerals in the Drawings | | Item Packaging Material No. | Unit | | 7 | 8 | C1 | C2 | C3 | C4 | C5 |
| Composition and Layer Structure of Packaging Materials | | Amount of L-LDPE | wt % | | 94 100 | 86 | 100 | 79 | 79 | 79 | 79 |
| | | Amount of LDPE | wt % | | 0 0 | 9.5 | 0 | 15 | 15 | 15 | 15 |
| | | Amount of Light-shielding Substance (Carbon Black Save Inventive Sample No. 6) | wt % | | 6 0 | 4.5 | 0 | 6 | 6 | 6 | 6 |
| | | Thickness of L-LDPE Film Layer | | | | | | | | | |
| | 7 | (to face an article) | μm | | 50 — | 50 | 50 | 50 | 70 | 50 | 100 |
| | 7 | (not to face an article) | μm | | — 50 | 50 | — | — | — | — | — |
| | 2 | Thickness of LDPE Layer | μm | | — | — | — | — | — | — | — |
| | 3 | Flexible Sheet Type | — | | 35 g/m² Bleached Kraft Paper | 70 g/m² Unbleached Kraft Paper | — | — | 35 g/m² Bleached Kraft Paper | 35 g/m² Bleached Kraft Paper | 35 g/m² Bleached Kraft Paper |
| | 3 | Flexible Sheet Thickness | μm | | 43 | 78 | — | — | 43 | 43 | 43 |
| | 5 | Metal Foil Thickness | μm | | Aluminum Foil 7 | as left | — | — | Aluminum Foil 7 | Aluminum Foil 7 | Aluminum Foil 7 |
| | 4 | Adhesive Layer Type and Thickness | μm | | (LDPE + L-LDPE)15 45 wt % 55 wt % | LDPE 15 × 2 | — | — | LDPE 15 × 1 | LDPE 15 × 2 | LDPE 15 × 1 |
| | 4a,4b | Heat-sealing Layer Type and Thickness | μm | | LDPE 15 × 2 | LDPE 15 | — | — | — | — | — |
| | 6 | Layer Structure Figure | — | | FIG. 12 | FIG. 13 | FIG. 1 | FIG. 4 | FIG. 5 | FIG. 6 | FIG. 5 |
| | | Total Thickness of Laminated Film | μm | | 208 | 230 | 50 | 50 | 138 | 134 | 170 |
| | | Thickness Ratio of Two L-LDPE Layers | % | | 30 | 0 | — | — | — | — | — |
| Properties | | Tear Strength | | | | | | | | | |
| | | Longitudinal | g | | 1443 | uncut | 610 | 794 | 326 | 393 | 481 |
| | | Transverse | g | | uncut more than 1600 | uncut | 817 | 951 | 354 | 374 | 537 |
| | | Impact Perforation Strength | kg · cm | | 29.1 | unperforated | 9.3 | 10.8 | 7.6 | 8.8 | 10.3 |
| | | Moistureproofness | g/m² · 24 hr | | A no more than 3 | A no more than 3 | X15 | X17 | A no more than 3 | A no more than 3 | A no more than 3 |
| | | Light-shielding Properties | | | A | A | X | C | B | B | A |
| | | Peeling Electrostatic Voltage | V | | B + 52 | B + 45 | X-912 | X-750 | B + 24 | B + 33 | B + 59 |
| | | Hot-Tack Properties (Hot-seal Ability) | | | A | B | B | B | A | A | A |
| | | Curling | | | | | | | | | cylindrically rolled up |

Unless otherwise specified, the starting packaging materials were as follows:

Measurement of melt index (MI) was conducted according to JISK 6760 (=Astm 1238).

L-LDPE polyethylenic polymer layers 1 and 7 . . .
ULTZ EX 2020L manufactured by Mitsui Petrochemical Co.
MI: 2.5 g/10 min., and Density: 0.922 g/cm$^3$ LDPE film layer 2 . . .
DFD-0111 manufactured by Nippon Unicar
MI: 2.4 g/10 min., and Density: 0.923 g/cm$^3$ LDPE adhesive layer 4 and 4a . . .
MIRASON 14 by Mitsui Polychemical
MI: 5.1 g/10 min., density 0.919 g/cm$^3$ L-LDPE adhesive layers 4 and 4a and L-LDPE polyethylenic polymer layers 1 and 7 to be bonded directly to aluminum foils . . .
ULTZ EX 2080C manufactured by Mitsui Petrochemical
MI: 8 g/10 min., and Density: 0.920 g/cm$^3$ LDPE heat-sealing layer 6 . . .
MIRASON 15 manufactured by Mitsui Polychemical
MI: 4.0 g/10 min., and Density: 0.917 g/cm$^3$ Carbon black . . . Oil furnace Black
Average Particle Size: 21 microns, pH 7.7 In Table 1, various estimation marks generally have the following meanings.

A very excellent
B excellent
C practical
D problematic
X unpractical

The testing procedures are as follows. Thickness . . . According to JIS P8118

Thickness Ratio of Two L-LDPE Layers (as already defined)

Tear Strength . . . According to JIS P8116

Impact Perforation Strength . . . According to JIS P8134

Moistureproofness (Moisture Permeability) . . .
According to JIS Z 0208-1976, (40° C. 90%, g/m$^2$ 24 hr)

Light-Shielding Properties . . .
Photographic films of ASA 100 were placed in bags formed of the respective packaging materials and after for complete sealing were exposed to light of 80,000 luces for one hour to determine and estimate the light-shielding properties thereof in terms of the degree of fogging.

Peeling Electrostatic Voltage . . .
An endless bolt of 35 mm in width and 1350 mm in length was formed of the sheet to be tested, and was passed between a 500 g-loading SUS roller and a SUS roller at a speed of 12 m/min. to read the amount of charges on a voltmeter.

Hot Tack Properties (Hot-Seal Ability) . . .
Determined in terms of a hot-peeling length (cm) when pulled each of a 45 g-load were given at a peeling angle of 22.5° to both open ends of a bag formed of packaging materials (width: 15 mm) just after heat sealing had been effected at 160° C.

What is claimed is:

1. A packaging film for photosensitive materials, which is a laminated film comprising an aluminum foil and two L-LDPE polyethylenic polymer layers, one L-LDPE polyethylenic polymer layer laminated onto one side of said aluminum foil and one L-LDPE polyethylenic polymer layer laminated to the other side of said aluminum foil, and in which:
   (a) said L-LDPE polyethylenic polymer layers contain 50% by weight or more of a low-pressure-processed, linear low-density polyethylene resin (L-LDPE),
   (b) at least one of said L-LDPE polyethylenic polymer layers containing at least 0.5% by weight of a light-shielding substance,
   (c) said two L-LDPE polyethylenic polymer layers, formed on both sides of said aluminum foil, have a thickness ratio of no higher than 50%, and
   (b) said laminated film has a moisture permeability of no higher than 10 g/m$^2$ 24 hr (40° C. 90% RH).

2. The packaging film as defined in claim 1, in which said L-LDPE polyethylenic polymer layers are laminated directly or indirectly onto said aluminum foil without or through adhesive layers.

3. The packaging film as defined in claim 1, in which said light-shielding substance is contained at least in the said L-LDPE polyethylenic polymer layer located at least on the side facing the article to be packaged.

4. The packaging film as defined in claim 1, in which said light-shielding substance is carbon black.

5. The packaging film as defined in claim 1, in which said aluminum foil has a thickness of 6 to 15 microns, said L-LDPE polyethylenic polymer layers each have a thickness of 20 to 100 microns, said L-LDPE resin has a density of 0.91 to 0.935, and said light-shielding substance is carbon black which is contained in said L-LDPE polyethylenic polymer layer in an amount of 1 to 15% by weight.

6. The packaging film as defined in claim 5, in which said carbon black is oil furnace carbon black.

7. The packaging film as defined in claim 6, in which said oil furnace carbon black has a pH value of 5 to 9, and contains 50% or less of particles having a particle size of no higher than 30 microns.

8. The packaging film as defined in claim 1, in which said two L-LDPE polyethylenic polymer layers have a thickness ratio of no higher than 30%.

9. The packaging film as defined in claim 1, wherein said L-LDPE polyethylenic polymer contains at least 60% by weight of L-LDPE resin.

10. The packaging film as defined in claim 1, wherein the balance the L-LDPE polyethylenic polymer is consists essentially of at least one of thermoplastic resin.

11. The packaging film as defined in claim 10, wherein the thermoplastic resin is olefinic resin or ethylene copolymer, or a mixture thereof.

12. The packaging film as defined in claim 11, wherein the thermoplastic resin is substantially high pressure processed low density polyethylene (LDPE).

13. The packaging film as defined in claim 12, wherein said L-LDPE polyethylenic polymer contains at least 5 weight % of high pressure processed low density polyethylene (LDPE).

14. The packaging film as defined in claim 12, wherein the light shielding substance is incorporated in said L-LDPE polyethylenic polymer through a masterbatch of LDPE to which the light shielding substance is first admixed before blending with said L-LDPE resin.

15. The packaging film as defined in claim 1, wherein said L-LDPE resin is a copolymer of ethylene with other alpha-olefins having short branches on a linear straight chain and having 3–13 carbon atoms.

16. The packaging film as defined in claim 15, wherein said L-LDPE resin includes 0.5–10 mol % of other alpha-olefins.

17. The packaging film as defined in claim 15, wherein said alpha-olefins are of 4–10 carbon atoms.

18. The packaging film as defined in claim 1, wherein L-LDPE resin has a melt index of 0.1–18 g/10 min.

* * * * *